Patented May 16, 1933

1,909,688

UNITED STATES PATENT OFFICE

ERWIN KRAMER, OF COLOGNE-DEUTZ, BERNHARD BOLLWEG, OF LEVERKUSEN, AND LUDWIG ZEH, OF WIESDORF, GERMANY, ASSIGNORS TO GENERAL ANILINE WORKS, INC., OF NEW YORK, N. Y., A CORPORATION OF DELAWARE

MANUFACTURE OF 1.2.5.6-DIBENZOPHENAZINE AND ITS DERIVATIVES

No Drawing. Application filed July 10, 1930, Serial No. 467,126, and in Germany August 3, 1929.

The present invention relates to a process of preparing azine compounds and more particularly it relates to the manufacture of 1.2.5.6-dibenzophenazine and its derivatives.

According to the present invention 1.2.5.6-dibenzophenazine of the formula

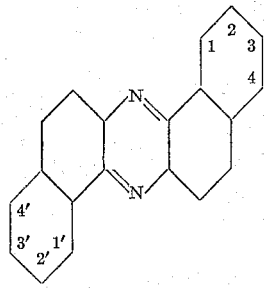

and its derivatives are prepared by reacting upon 2-naphthylamine and its nuclear substitution products having a free 1-position by heating to a temperature between about 100–250° C. with at least the calculated quantity of a metallic oxide yielding oxygen under the conditions of the reaction, as for instance copper oxide, manganese dioxide, silver oxide, or mercuric oxide, in inert high boiling organic solvents, as for instance trichlorobenzenes, dichlorobenzene, chloronaphthalenes until water is no longer formed in the reaction.

The new mode of working according to the invention has the advantage of great simplicity and furnishes products of great purity in a good yield.

As starting materials for the process such nuclear substitution products of 2-naphthylamine having a free 1-position come into consideration as will not be decomposed or changed by the attack of the oxygen. To illustrate, products such as, for instance, halogen-2-naphthylamines, alkyl-2-naphtylamines, acylamine-2-naphthylamines, naphtol-ether-2-naphthylamines, 2-naphthylamine-sulfonic acid amides may be employed.

Our invention is further illustrated by the following examples without being restricted thereto:

*Example 1.*—145 parts by weight of 2-naphthylamine and 250 parts by weight of cupric oxide are heated at 180–200° C. in 750 parts by weight of trichlorobenzene until no further distillation of water formed during the reaction takes place, this point being reached after approximately one hour. The trichlorobenzene is thereupon removed by means of steam distillation, the copper precipitate is dissolved by the addition of nitric acid and the 1.2.5.6-dibenzophenazine is filtered by suction. The crude product takes the form of slightly brownish yellow needles and has a melting point of 277–278° C. The yield amounts to over 90%. By recrystallization from trichlorobenzene pale yellow lustrous needles are obtained, which show the properties described in the literature (Beilstein IV, page 1083).

*Example 2.*—40 parts by weight of β-naphthylamine are dissolved in 300 parts by weight of 1.2.4-trichlorobenzene at about 100° C. and 100 parts by weight of silver oxide are added thereto. Then the temperature is gradually increased until the oxidation takes place very actively. In order to finish the reaction the mixture is boiled again and the 1.2.5.6-dibenzophenazine is isolated as mentioned in Example 1.

*Example 3.*—70 parts by weight of β-naphthylamine are boiled in 400 parts by weight of 1.2.4-trichlorobenzene with 180 parts by weight of mercuric oxide while stirring. The suspension which is at first colored red shades soon becomes black in color on the splitting of water. After boiling for about 2 hours it is cooled and the filtered off residue is extracted by means of hot chlorobenzene. The 1.2.5.6-dibenzophenazine separates on cooling in the form of well formed crystals and shows all the properties of the product described in Example 1.

*Example 4.*—145 parts by weight of β-naphthylamine mixed with 170 parts by weight of pyrolusite are boiled in 800 parts by weight of 1.2.4-trichlorobenzene for about 10 hours while stirring. The mixture is then sucked off and cooled. The precipitated 1.2.5.6-dibenzophenazine is cooled slightly grey shades. By recrystallizing from trichlorobenzene or sublimation under reduced pressure it can be easily obtained in a completely pure form.

*Example 5.*—30 parts by weight of 6-methyl-2-naphthylamine and 50 parts by weight of cupric oxide are heated in trichlorobenzene as described in Example 1. Bz-3-Bz'-3'-dimethyl-1.2.5.6 - dibenzophenazine is thereby obtained. It crystallizes from nitrobenzene in yellow, lustrous needles, which melt at 328° C. and dissolve in sulfuric acid with a brilliant blue coloration.

*Example 6.*—20 parts by weight of 6-bromo-2-naphthylamine are heated with 24 parts by weight of cupric oxide in 300 parts by weight of trichlorobenzene until the splitting off of water has ceased. After filtering, and when cold, the trichlorobenzene is washed out, the copper precipitate is dissolved by means of dilute nitric acid and the crystalline residue is filtered by suction. The Bz-3-Bz'-3'-dibromo-1.2.5.6-dibenzophenazine crystallizes from nitrobenzene in pale yellow, strongly lustrous leaflets, which melt above 340° C. The substance dissolves in sulfuric acid with a reddish blue coloration.

*Example 7.*—70 parts by weight of 2-amino-8-naphthol-methylether are boiled with 80 parts by weight of cupric oxide in 750 parts by weight of trichlorobenzene until the splitting off of water is complete. The further working up can follow as in Example 1 or the solution is diluted with benzene and filtered by suction. The Bz-1Bz'-1'-dimethoxydibenzophenazine is obtained from the filtrate by distilling off the benzene and subsequent steam distillation. The product crystallizes from chlorobenzene in the form of yellow needles, which melt at 222° C. From benzene large, broad, deep yellow needles are obtained, which lose their strong lustre at 100° C. and become more bright in color. In glacial acetic acid the substance dissolves with a red coloration and in sulfuric acid with a brilliant blue coloration.

*Example 8.*—59 parts by weight of 2-amino-7-naphthol-methylether are boiled with 92 parts by weight of cupric oxide in 1100 parts by weight of trichlorobenzene until the splitting off of water is complete. After then filtering by suction while hot and washing with hot trichlorobenzene the Bz-2-Bz'-2'-dimethoxy-1.2.5.6-dibenzophenazine is obtained from the filtrate after cooling in yellow needles. It melts at 281° C. and dissolves in glacial acetic acid with a yellow coloration and in sulfuric acid with a violet coloration.

*Example 9.*—60 parts by weight of 2-naphthylamino-6-sulfonic acid anilide and 48 parts by weight of cupric oxide are boiled in 600 parts by weight of trichlorobenzene until the splitting off of water is complete, then filtered by suction while hot and subsequently washed with hot trichlorobenzene. The 1.2.5.6-dibenzophenazine Bz-3-Bz'-3'-disulfonic acid anilide crystallizes from the filtrate in small bright greenish yellow needles. They are readily soluble in acetone and pyridine, somewhat more difficultly soluble in nitrobenzene, rather difficulty soluble in chlorobenzene. When pure the substance melts at 326° C. The solution in sulfuric acid is violet in colour.

*Example 10.*—32 parts by weight of monoacetyl-2:7-naphthylenediamine are boiled with 40 parts by weight of cupric oxide in 600 parts by weight of trichlorobenzene until the splitting off of water is complete. After filtering by suction the copper precipitate is extracted with hot trichlorobenzene. The Bz-2-Bz'-2'-di-(acetamino)-1.2.5.6-dibenzophenazine crystallizes from nitrobenzene in silver grey leaflets, which melt at 255° C. and dissolve in sulfuric acid with a violet coloration.

We claim:

1. Process of preparing 1.2.5.6-dibenzophenazine compounds comprising heating a compound of the group consisting of 2-naphthylamine and its halogen-, alkyl-, alkoxy-, acylamino-, sulfonamide- and sulphonarylide- nuclear substitution products having a free 1-position at a temperature of between 100–250° C. in a high boiling inert organic solvent boiling between 100 and 250° C. in presence of a metallic oxide yielding oxygen under the conditions of reaction.

2. Process of preparing 1.2.5.6-dibenzophenazine comprising heating 2-naphthylamine at a temperature of between 100–250° C. in a high boiling inert organic solvent boiling between 100 and 250° C. in presence of a metallic oxide yielding oxygen under the conditions of reaction.

3. Process of preparing 1.2.5.6-dibenzophenazine comprising heating 145 parts by weight of 2-naphthylamine in 750 parts by weight of trichlorobenzene at a temperature of 180–200° C. until no more water is formed in the reaction, in presence of 250 parts by weight of copper oxide.

In testimony whereof, we affix our signatures.

ERWIN KRAMER.
BERNHARD BOLLWEG.
LUDWIG ZEH.